United States Patent Office 3,443,894
Patented May 13, 1969

3,443,894
PROCESS FOR PRODUCING KAPPA ALUMINA
Walter H. Gitzen, Belleville, Ill., and Leroy D. Hart, St. Louis, Mo., assignors to Aluminum Company of America, Pittsburgh, Pa., a corporation of Pennsylvania
No Drawing. Filed Aug. 30, 1966, Ser. No. 575,968
Int. Cl. C01f 7/00
U.S. Cl. 23—142                                            5 Claims

ABSTRACT OF THE DISCLOSURE

Mixing a siliceous material and aluminum fluoride with particles of alumina trihydrate and heating the resultant mixture at a temperature of 1100° to 1275° C. to convert the alumina trihydrate to kappa alumina.

---

This invention relates to a method for producing kappa phase alumina. More particularly the invention is directed to producing a high yield of kappa phase alumina from alumina trihydrate.

In conventional methods of producing kappa phase alumina, various techniques utilizing thermal decomposition of hydrated alumina have been employed. These techniques usually include controlled dehydration of alumina trihydrate to produce intermediate phase chi and then upon further dehydration a certain amount of kappa phase alumina is yielded and ultimately alpha alumina is formed. Although by controlling the dehydration process kappa phase alumina is produced, the resultant product also contains other crystalline phases of alumina. This is particularly true in preparing kappa alumina on a commercial scale where the temperature of the material being treated is critical and control of the proper temperature is difficult. Ideally, to produce kappa phase alumina without any contamination or at least a very small amount of other phase aluminas in the final product, the transition of kappa phase to alpha phase should be repressed until as much of the kappa phase is formed as possible.

A discussion of kappa phase alumina and the method of detecting kappa phase alumina by X-ray powder diffraction patterns is found in "Technical Paper No. 10, Second Revision, Alumina Properties," J. W. Newsome, H. W. Heiser, A. S. Russell, H. C. Stumpf, Aluminum Company of America, 1960.

Kappa alumina is used as a polishing agent and mild abrasive, particularly as a dentifrice abrasive. For this type of application, it is very desirable to employ substantially pure kappa alumina free from contamination by other alumina phases, especially alpha alumina, which is a harsher abrasive.

It is an object of this invention to provide a new and improved method of producing kappa phase alumina.

Another object of the invention is to provide a new and improved method of producing kappa phase alumina which is substantially free of other crystalline phases of alumina.

Still another object of the invention is to provide a method of producing kappa phase alumina which is substantially free of other crystalline phases of alumina and which has a low soluble soda content.

In accordance with this invention, it has been found that when a mixture of siliceous material, particles of alumina trihydrate and a small amount of aluminum fluoride is heated to a temperature of 1100° to 1275° C., the alumina trihydrate is converted to kappa phase alumina. The process produces a high yield of kappa phase alumina, i.e., at least 50 percent of kappa phase alumina, the balance of the resultant product being substantially amorphous (noncrystalline) material. The fact that there is a high yield of kappa phase alumina without contamination by alpha phase alumina is quite surprising. Normally, heating of alumina trihydrate to these temperatures produces a very large percentage of alpha phase alumina. Moreover, the addition of aluminum fluoride to alumina trihydrate has been heretofore for the purpose of accelerating the transformation of the alumina trihydrate to alpha phase alumina at elevated temperatures. In the present invention, however, the siliceous material and aluminum fluoride somehow produces an alumina containing at least 50%, by weight, kappa phase alumina and little or no trace of alpha phase alumina when the mixture is heated in accordance with the invention.

Generally the period of heating within the temperature range of 1100° to 1275° C. should be for a sufficient length of time to convert the alumina trihydrate to kappa phase alumina and in commercial practice it usually extends over a period of about 30 minutes to 4 hours, the length of time being dependent upon the temperature, mass of the mixture being heated, and the amount of siliceous material added. The term "siliceous material" as used herein means a material that will provide silica values which, when mixed with alumina trihydrate and heated in accordance with the invention, will aid in the conversion of the alumina trihydrate to kappa phase alumina.

The siliceous material may be added to the alumina trihydrate in various forms, such as, for example, silicic acid, bentonite clay, flint, or colloidal silica. The siliceous material should, as a practical matter, be of a particle size fine enough, preferably to substantially pass a 325 mesh screen, to insure good dispersion of the additive in the alumina trihydrate. The amount of siliceous material added for maximum conversion to kappa phase alumina should be equivalent to 1 to 14%, by weight, of $SiO_2$, on the basis of $Al_2O_3$.

The aluminum fluoride should be present in the above-described mixture in the amount of 0.2 to 2 percent, by weight, based on $Al_2O_3$, as this range has been found to produce satisfactory results in most cases. In carrying out this invention, both the aluminum fluoride and the siliceous material should be of a particle size fine enough to insure good dispersion of the additives in the blending of the mixture for best results.

When kappa phase alumina is used as an abrasive, for example, as a dentifrice abrasive, it is preferable to reduce the soluble soda content to a minimum because of its deleterious effect on the rheological properties of the paste and because of chemical attack on the paste container. When the above-described mixture of siliceous material, aluminum fluoride and particles of alumina trihydrate is heated to a temperature of 1100° to 1275° C., the alumina produced, which is substantially kappa phase alumina, has a lower soluble soda content than that of the alumina trihydrate starting material. When reference is made to the amount of soluble soda content of alumina trihydrate herein it means that amount present when the alumina trihydrate is dehydrated to permit leaching of the soluble soda.

The improvement in producing kappa phase alumina from alumina trihydrate by adding a siliceous material and aluminum fluoride and thereafter heating the resultant mixture in accordance with the invention is illustrated in the following examples.

Example I

A batch of alumina trihydrate particles produced by the conventional Bayer process was divided into three lots. The initial starting material of alumina trihydrate contained 0.25%, by weight, soluble soda, based on $Al_2O_3$. Lot A consisted of alumina trihydrate and silicic acid added to the alumina trihydrate in an amount equivalent to 3 percent, by weight, $SiO_2$ based on $Al_2O_3$. Lot B consisted of alumina trihydrate and aluminum fluoride in an amount equivalent to 0.5 percent, by weight, based on $Al_2O_3$. Lot C consisted of alumina trihydrate, silicic acid added to the alumina trihydrate in an amount equivalent to 3 percent, by weight, $SiO_2$ based on $Al_2O_3$, and aluminum fluoride in an amount equivalent to 0.5 percent, by weight, based on $Al_2O_3$. The materials of each lot were heated separately at 1200° C. for one hour, under identical conditions.

X-ray diffraction analysis was performed on the resultant products of Lots A, B and C. The product obtained from Lot A contained more than 75%, by weight, alpha alumina, and less than 25% kappa alumina. Analysis of Lot B revealed more than 90%, by weight, alpha alumina with no detectable kappa phase. However, the product obtained from Lot C with both the siliceous additive and the aluminum fluoride additive contained more than 75%, by weight, kappa phase alumina, the balance being substantially amorphous material. The soluble soda content of Lot C was 0.13%, by weight, ($Al_2O_3$ basis), which represents a reduction of approximately one-half of the soluble soda content from that of the alumina trihydrate starting material.

Example II

A batch of alumina trihydrate particles produced by the Bayer process having a soluble soda content of 0.25%, by weight, based on $Al_2O_3$ was divided into two lots. Lot A consisted of alumina trihydrate with no additives and was heated at 1250° C. for one hour. Lot B had silicic acid added to the alumina trihydrate in an amount equivalent to 12 percent, by weight, $SiO_2$, based on $Al_2O_3$ and aluminum fluoride added in an amount equivalent to 1 percent, by weight, based on $Al_2O_3$. The resultant mixture of Lot B was heated at 1260° C. for one hour.

X-ray diffraction analysis was performed on the product of both Lot A and Lot B. Such analysis of Lot A showed more than 90% alpha phase and no detection of kappa phase alumina. Analysis of Lot B with the siliceous additive and aluminum fluoride additive showed more than 75% kappa alumina with no detectable alpha phase, and the balance being substantially amorphous material. The product obtained from Lot B showed a large reduction in soluble soda as the final product contained only 0.003 percent, by weight ($Al_2O_3$ basis), soluble soda.

Example III

A batch of alumina trihydrate particles produced by the Bayer process having a soluble soda content of 0.25%, by weight, based on $Al_2O_3$ was divided into two lots. Lot A consisted of only the alumina trihydrate with no additives. Lot B had added to the alumina trihydrate some silicic acid in an amount equivalent to 3 percent, by weight, $SiO_2$ based on $Al_2O_3$ and also aluminum fluoride in an amount equivalent to 0.5 percent, by weight, based on $Al_2O_3$. Both the material of Lot A and Lot B were heated separately at 1100° C. for one hour.

X-ray diffraction analysis was performed on the resultant product of Lots A and B. The product obtained from Lot A did not contain any detectable amount of kappa phase alumina. Lot B contained more than 75% kappa phase alumina with no detectable alpha phase, and the balance being substantially amorphous material. In addition, the product obtained from Lot B plus additives was analyzed for soluble soda content and was found to contain only 0.07 percent, by weight, soluble soda.

While the invention has been described and several embodiments thereof have been exemplified, it will be obvious to those skilled in the art that modifications of the invention are possible without departing from the scope thereof.

What is claimed is:

1. A method of producing kappa alumina which comprises mixing a siliceous material and aluminum fluoride with particles of alumina trihydrate and heating the resultant mixture at a temperature of 1100° to 1275° centigrade for a sufficient amount of time to convert the alumina trihydrate to alumina containing at least 50% by weight kappa alumina, said siliceous material being present in an amount sufficient to cause conversion of said alumina trihydrate to said alumina containing at least 50% by weight kappa alumina at said temperature of 1100° C. to 1275° C. and said siliceous material being a material that will provide silica values which when mixed with said alumina trihydrate and heated for said sufficient amount of time at said 1100° to 1275° C. will aid in the conversion of said alumina trihydrate to said alumina containing at least 50% by weight kappa alumina.

2. A method of producing kappa phase alumina according to claim 1, wherein the siliceous material is added to the alumina trihydrate in the amount equivalent to 1 to 14 percent $SiO_2$, by weight, based on $Al_2O_3$ and wherein the aluminum fluoride is added in the amount equivalent to 0.2 to 2 percent, by weight, based on $Al_2O_3$.

3. The method of claim 1 wherein the siliceous material is silicic acid, bentonite clay, flint, or colloidal silica.

4. A method of producing kappa phase alumina which comprises:

mixing with particles of alumina trihydrate a siliceous material in an amount equivalent to 1 to 14% $SiO_2$, by weight, based on $Al_2O_3$, and aluminum fluoride in an amount equivalent to 0.2 to 2%, by weight, based on $Al_2O_3$, and heating the resultant mixture at a temperature of 1100° to 1275° centigrade for a period of from 30 minutes to 4 hours to convert the alumina trihydrate to an alumina containing at least 50%, by weight, kappa phase alumina.

5. A method of producing a low soluble soda content kappa alumina which comprises.

mixing together a siliceous material, aluminum fluoride and particles of alumina trihydrate containing soda, and heating the resultant mixture at a temperature of 1100° to 1275° centigrade for a sufficient amount of time to convert the alumina trihydrate to an alumina containing at least 50% by weight kappa alumina and having a lower soluble soda content than the alumina trihydrate, said siliceous material being present in a sufficient amount to convert said alumina trihydrate to said alumina containing at least 50% by weight kappa alumina and said siliceous material being a material that will provide silica values which when mixed with said alumina trihydrate and heated for said sufficient amount of time at said 1100° to 1275° centigrade will aid in the conversion of said alumina trihydrate to said alumina containing at least 50% by weight kappa alumina.

References Cited

UNITED STATES PATENTS

| | | | |
|---|---|---|---|
| 1,036,454 | 8/1912 | Childs | 23—142 |
| 2,398,610 | 4/1946 | Bailey et al. | 23—143X |
| 2,437,531 | 3/1948 | Huffman | 208—136 |
| 2,887,361 | 5/1959 | Fenerty. | |
| 2,961,297 | 11/1960 | Fenerty | 23—142 |
| 3,003,919 | 10/1961 | Broge | 23—142X |
| 3,106,452 | 10/1963 | Watson et al. | |
| 3,227,521 | 1/1966 | Carithers et al. | |
| 3,261,703 | 7/1966 | Hart et al. | |

OTHER REFERENCES

Newsome et al., "Alumina Properties," Aluminum Co. of America, 1960, pp. 11 and 46.

OSCAR R. VERTIZ, *Primary Examiner.*

G. T. OZAKI, *Assistant Examiner.*